(12) United States Patent
Kim

(10) Patent No.: US 11,292,471 B2
(45) Date of Patent: Apr. 5, 2022

(54) DRIVING CONTROL METHOD AND SYSTEM FOR VEHICLE

(71) Applicants: Hyundai Motor Company, Seoul (KR); Kia Motors Corporation, Seoul (KR)

(72) Inventor: Gwi Chul Kim, Anyang-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 329 days.

(21) Appl. No.: 16/566,773

(22) Filed: Sep. 10, 2019

(65) Prior Publication Data

US 2020/0361465 A1 Nov. 19, 2020

(30) Foreign Application Priority Data

May 17, 2019 (KR) .................. 10-2019-0057765

(51) Int. Cl.
*B60W 30/182* (2020.01)
*B60W 30/02* (2012.01)
(Continued)

(52) U.S. Cl.
CPC .......... *B60W 30/182* (2013.01); *B60W 10/02* (2013.01); *B60W 30/02* (2013.01);
(Continued)

(58) Field of Classification Search
CPC ....... B60W 2520/263; B60W 2540/10; B60W 2540/18; B60W 2710/021; B60W 2710/30; B60W 2710/02; B60W 2710/182; B60W 10/02; B60W 2050/0095; B60W 2050/0096; B60W 2520/00; B60W 2520/26; B60W 30/00; B60W 30/02; B60W 30/182; B60W 10/00; B60W 10/12; B60W 10/119; B60W 10/14; B60W 2510/00; B60W 2510/02; B60W 2510/0208; B60W 2510/0225; B60W 2710/00; B60W 2710/022; B60K 6/52; B60K 23/00; B60K 23/0808; B60K 23/08; B60K 23/085;
(Continued)

(56) References Cited

U.S. PATENT DOCUMENTS

| 10,272,925 B1* | 4/2019 | Wicks | .................. B60W 10/02 |
| 2012/0179334 A1* | 7/2012 | Gagnon | ............... B62D 5/0463 |
| | | | 701/41 |

FOREIGN PATENT DOCUMENTS

| JP | 4514100 B2 | 7/2010 |
| JP | 2019-038378 A | 3/2019 |
| KR | 10-1521388 B1 | 5/2015 |

* cited by examiner

Primary Examiner — Anthony R Jimenez
(74) Attorney, Agent, or Firm — Morgan, Lewis & Bockius LLP

(57) ABSTRACT

A method and a system for controlling driving of a vehicle according to a driving intent of a driver in a sports mode, may include determining a situation in which whether sporty driving is required for the vehicle due to an output value reflecting a driving state of the vehicle which is driving in a sports mode, and, when the situation is determined as requiring the sporty driving, controlling, by the controller, the clutch mechanism to release a coupling between the front wheel and the front wheel drive motor for the vehicle to drive in a rear wheel drive manner, and the system to which the method is applied.

12 Claims, 4 Drawing Sheets

(51) Int. Cl.
*B60W 10/02* (2006.01)
*B60K 6/52* (2007.10)

(52) U.S. Cl.
CPC .......... *B60K 6/52* (2013.01); *B60W 2520/263* (2013.01); *B60W 2540/10* (2013.01); *B60W 2540/18* (2013.01); *B60W 2710/021* (2013.01)

(58) Field of Classification Search
CPC ............ B60K 23/0858; B60K 23/0875; B60K 23/0816; B60L 2260/00; B60L 2260/16; B60L 2260/20; B60L 2260/26; B60L 2260/28; B60L 2260/40; B60L 2240/00; B60L 2240/50; B60L 2240/507; B60L 2720/00; B60L 2720/40; B60L 2720/403
USPC .......................................................... 701/36
See application file for complete search history.

DRIVING CONTROL METHOD AND SYSTEM FOR VEHICLE

CROSS REFERENCE TO RELATED APPLICATION

The present application claims priority to Korean Patent Application No. 10-2019-0057765 filed on May 17, 2019, the entire contents of which is incorporated herein for all purposes by this reference.

BACKGROUND OF THE DISCLOSURE

Field of the Disclosure

The present invention relates to a method and a system for controlling a vehicle to drive in a sports mode suitable for a driver's driving intent.

Description of Related Art

In the case of an electric vehicle to which a front wheel drive motor and a rear wheel drive motor, which are independently driven, are applied, in a rear wheel drive vehicle, a rear wheel is a main drive wheel and a front wheel is an auxiliary drive wheel, whereas in a front wheel drive vehicle, the front wheel is the main drive wheel and the rear wheel is the auxiliary drive wheel.

In such a structure, when the electric vehicle is driving in a two-wheel drive (2WD) manner in which only the main driving wheel is operated whereas the auxiliary drive wheel is not operated, a rotating force is reversely delivered from the auxiliary drive wheel to a reduction gear, there is a problem in that a drag loss occurs.

Thus, when the electric vehicle is driving in the 2WD manner, it is necessary to take measures to prevent a drag loss by blocking the rotating force which is reversely input to a drive motor 1 through the auxiliary drive wheel. As shown in FIG. 1, as one of the measures for preventing the drag loss, a disconnector 2 may be disposed to connect or disconnect between the auxiliary drive wheel and the drive motor 1.

That is, in the 2WD manner, the electric vehicle has a structure in which the disconnector 2 is operated to be released such that the rotating force delivered from the auxiliary drive to the drive motor 1 is blocked and thus a drag loss is prevented.

However, such a control is a control strategy which is performed regardless of an intent of a driver so that there is required for a control strategy which is configured for providing the fun of driving by appropriately changing driving performance of a vehicle according to the intent of the driver.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and a system for controlling a vehicle to drive in a sports mode suitable for a driving intent of a driver.

According to one aspect, there is provided a method of controlling driving of a vehicle in which a front wheel drive motor and a rear wheel drive motor are provided to independently deliver a driving force to a front wheel and a rear wheel of the vehicle, and a clutch mechanism is provided between the front wheel and the front wheel drive motor, the method including determining, by a controller, a situation in which whether sporty driving is required for the vehicle due to an output value reflecting a driving state of the vehicle which is driving in a sports mode; and when the situation is determined as requiring the sporty driving, controlling, by the controller, the clutch mechanism to release a coupling between the front wheel and the front wheel drive motor for the vehicle to drive in a rear wheel drive manner.

When a rear wheel slip amount exceeds a reference value, an opening degree amount of an accelerator pedal exceeds a reference value, and a steering angle exceeds a reference value, the situation may be determined as requiring the sporty driving.

When the vehicle is driving in the rear wheel drive manner, an execution condition of electronic stability control (ESC) may be raised.

When the driving state is determined as a situation in which the sporty driving is not required, the method may further include controlling the clutch mechanism to be engaged to allow the vehicle to drive in a four-wheel drive manner.

The clutch mechanism may use a dog clutch.

According to another aspect, there is provided a system for controlling driving of a vehicle in which a front wheel drive motor and a rear wheel drive motor are provided to independently deliver a driving force to a front wheel and a rear wheel of the vehicle, and a clutch mechanism is provided between the front wheel and the front wheel drive motor, the system including a driving intent determination portion configured to determine a situation in which whether sporty driving is required for the vehicle due to an output value reflecting a driving state of the vehicle which is driving in a sports mode; and when the driving intent determination portion determines the driving state as the situation in which the sporty driving is required, a clutch controller configured to control the clutch mechanism to release a coupling between the front wheel and the front wheel drive motor for the vehicle to drive in a rear wheel drive manner.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
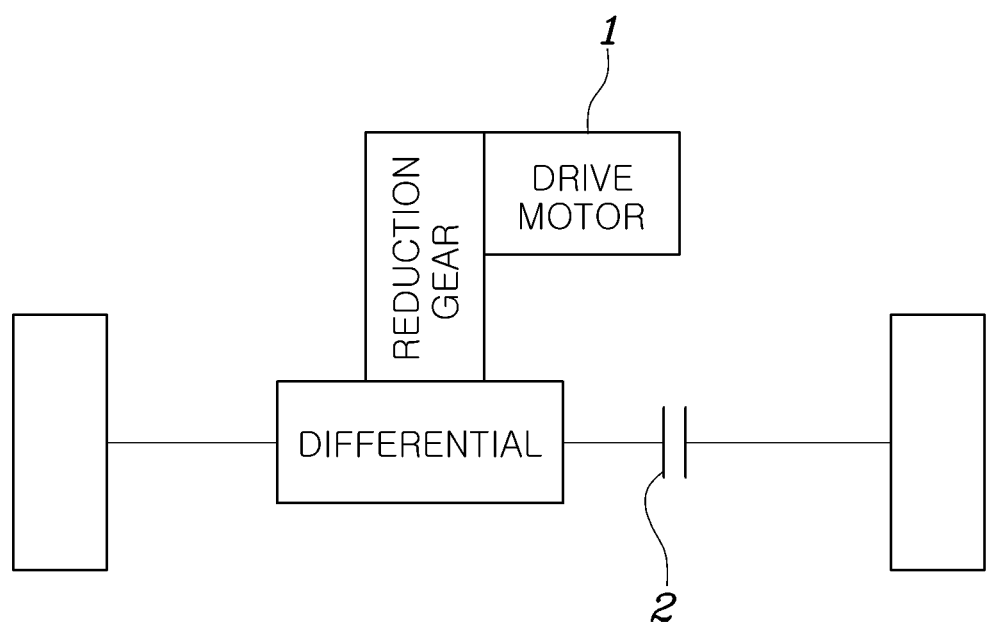
FIG. 1 is a schematic diagram illustrating an arrangement structure of a disconnector according to a related art.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF THE DISCLOSURE

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The exemplary embodiments according to an exemplary embodiment of the present invention may be variously modified and may have various forms, so that specific embodiments will be illustrated in the drawings and be described in detail in the present disclosure or application. It may be understood, however, that it is not intended to limit the exemplary embodiments according to the concept of the present invention to specific disclosure forms, but it includes all modifications, equivalents, and alternatives falling within the spirit and scope of the present invention.

The terms first, second, and/or the like may be used to describe various components, but the components should not be limited by these terms. These terms may be used only for the purpose of distinguishing one component from another component, and, for example, a first component may be referred to as a second element, and similarly, the second component may also be referred to as the first component without departing from the scope of the present invention.

When a component is referred to as being "connected," or "coupled" to other component, it may be directly connected or coupled to the other component, but it should be understood that another component may exist between the component and the other component. Contrarily, when a component is referred to as being "directly connected," or "directly coupled" to other component, it should be understood that another component may be absent between the component and the other component. Other expressions describing the relationship between components, that is, "between" and "immediately between," or "adjacent to" and "directly adjacent to" should also be construed as described above.

Terms used herein is used only for the purpose of describing specific embodiments, and are not intended to limit the present invention. Unless the context clearly dictates otherwise, the singular form includes the plural form. In this description, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Unless defined otherwise, all terms including technical or scientific terms used herein have the same meaning as commonly understood by those skill in the art to which an exemplary embodiment of the present invention pertains. General terms that are defined in a dictionary shall be construed to have meanings that are consistent in the context of the relevant art, and will not be interpreted as having an idealistic or excessively formalistic meaning unless clearly defined in an exemplary embodiment of the present invention.

Hereinafter, various exemplary embodiments of the present invention will be described in detail with reference to the accompanying drawings. Like reference numerals denote like members throughout the drawings.

Figure 2:
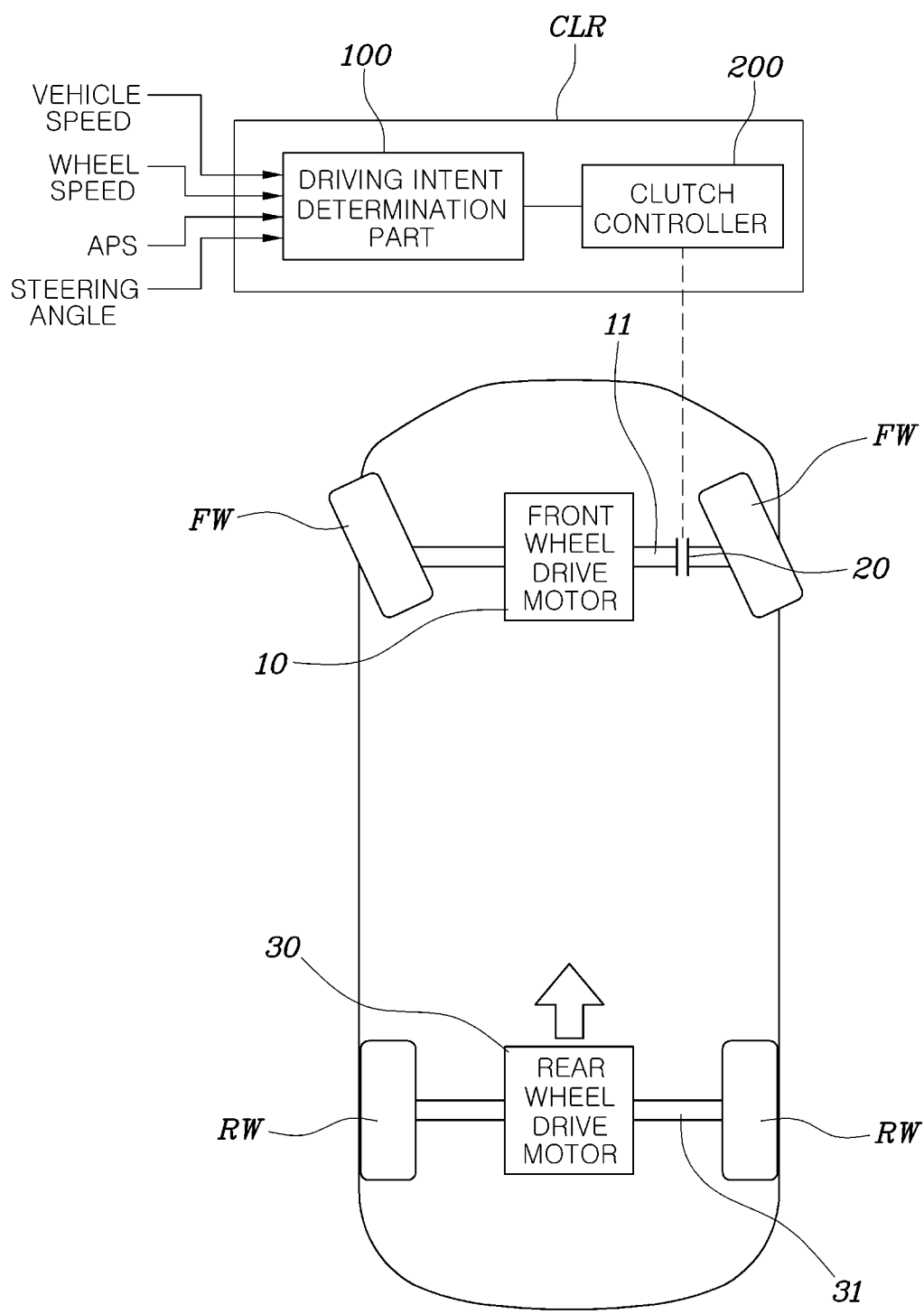
FIG. 2 is a diagram illustrating a configuration of a driving control system for a vehicle and a case in which a disconnector is released according to an exemplary embodiment of the present invention.
Figure 3:
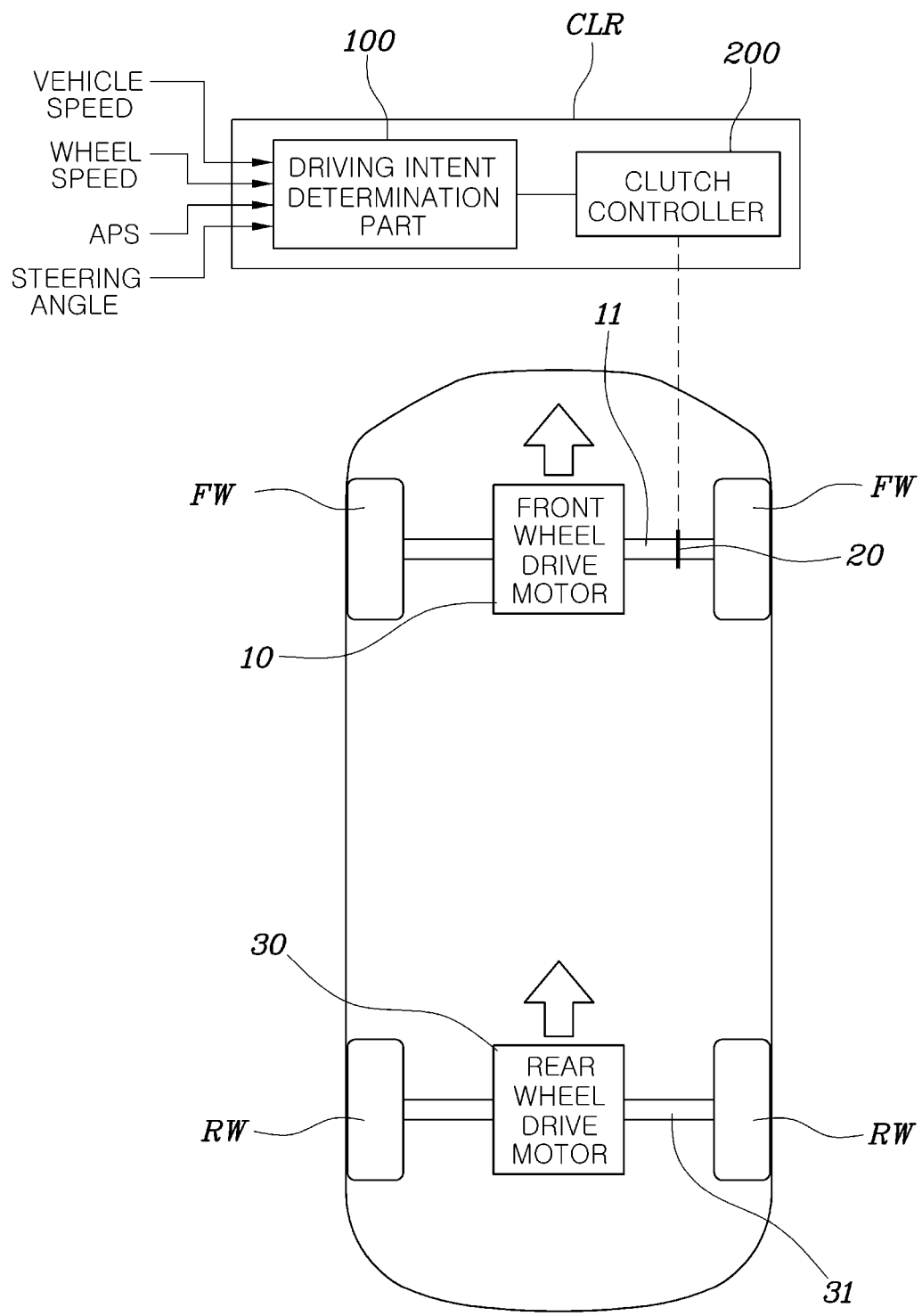
FIG. 3 is a diagram illustrating a case in which the disconnector according to an exemplary embodiment of the present invention is engaged.

As shown in FIG. 2 and FIG. 3, a vehicle to which a driving control logic according to an exemplary embodiment of the present invention is applicable may be an electric vehicle in which a front wheel drive motor 10 and a rear wheel drive motor 30 are configured to be respectively provided on a front wheel FW and a rear wheel RW and independently deliver a driving force to the front wheel FW and the rear wheel RW, and a clutch mechanism 20 is provided between the front wheel FW and the front wheel drive motor 10.

Here, the clutch mechanism 20 may be a disconnector utilizing a dog clutch to perform connection and disconnection operation. When the clutch mechanism 20 is engaged, the front wheel drive motor 10 and the front wheel FW are mechanically connected such that a driving force of the motor 10 is delivered to the front wheel FW, and, when the clutch mechanism 20 is released, the front wheel drive motor 10 and the front wheel FW are mechanically released such that the driving force of the front wheel drive motor 10 is not delivered to the front wheel FW.

Although not shown in the drawing, the front wheel drive motor 10 may be connected to a reduction gear, the reduction gear may be connected to a differential, a front wheel driveshaft 11 may be connected to both end portions of the differential, and the clutch mechanism 20 may be mounted on the front wheel driveshaft 11.

Furthermore, the rear wheel drive motor 30 may be connected to a reduction gear, the reduction gear may be connected to a differential, and a rear wheel driveshaft 31 may be connected to both end portions of the differential.

Furthermore, the clutch mechanism 20 is configured, when a control command is applied through a controller CLR, to be configured for performing engagement or release operations.

The controller CLR according to an exemplary embodiment of the present invention may be implemented with a nonvolatile memory configured to store data relating to an algorithm for controlling operations of various components of the vehicle or data relating to software commands for playing the algorithm, and a processor configured to perform operations, which will be described below, using the data stored in the nonvolatile memory. Here, the nonvolatile memory and the processor may be implemented as separate chips. Alternatively, the nonvolatile memory and the processor may be implemented as a single chip integrated with each other. The processor may be implemented in a form of one or more processors.

In an exemplary embodiment of the present invention, the controller CLR may include a driving intent determination portion 100 and a clutch controller 200.

Referring to FIG. 2 and FIG. 3, the driving intent determination portion 100 is configured to determine first a situation in which whether sporty driving is required for the vehicle due to an output value reflecting a driving state of the vehicle which is driving in a sports mode.

Here, the output value may include a rear wheel slip amount, an opening degree amount of an accelerator pedal, and a steering angle. The rear wheel slip amount may be obtained by comparing a vehicle speed with a speed value determined through a rear wheel speed sensor, the opening degree amount of the accelerator pedal may be detected through an accelerator pedal position sensor (APS), and the steering angle may be detected through a steering angle sensor.

When the driving intent determination portion 100 determines driving state of the vehicle as the situation in which the sporty driving is required, the clutch controller 200 controls the clutch mechanism 20 to be released to allow the vehicle to drive in a rear wheel drive manner.

That is, when a current driving state of the vehicle is determined as the situation in which the sporty running is required, the clutch controller 200 controls the clutch mechanism 20 to be released to mechanically release between the front wheel drive motor 10 and the front wheel FW.

Consequently, the vehicle is driving in a rear wheel drive manner and thus drift driving may be possible according to a driving intent of the driver such that the fun of driving may be provided.

However, when the driving intent determination portion 100 determines the situation as not requiring the sporty running, the clutch controller 200 controls the clutch mechanism 20 to be engaged to direct the front wheel FW and the rear wheel RW to be driven together.

Consequently, the vehicle is driving in a four-wheel drive (4WD) mode such that it is possible to improve driving safety against an escape due to low friction which is inherent to a 4WD manner and improve acceleration performance according to a high friction driving characteristic.

Meanwhile, a method for controlling driving of a vehicle according to an exemplary embodiment of the present invention includes a sporty driving determination operation and a rear-wheel drive control operation.

Figure 4:
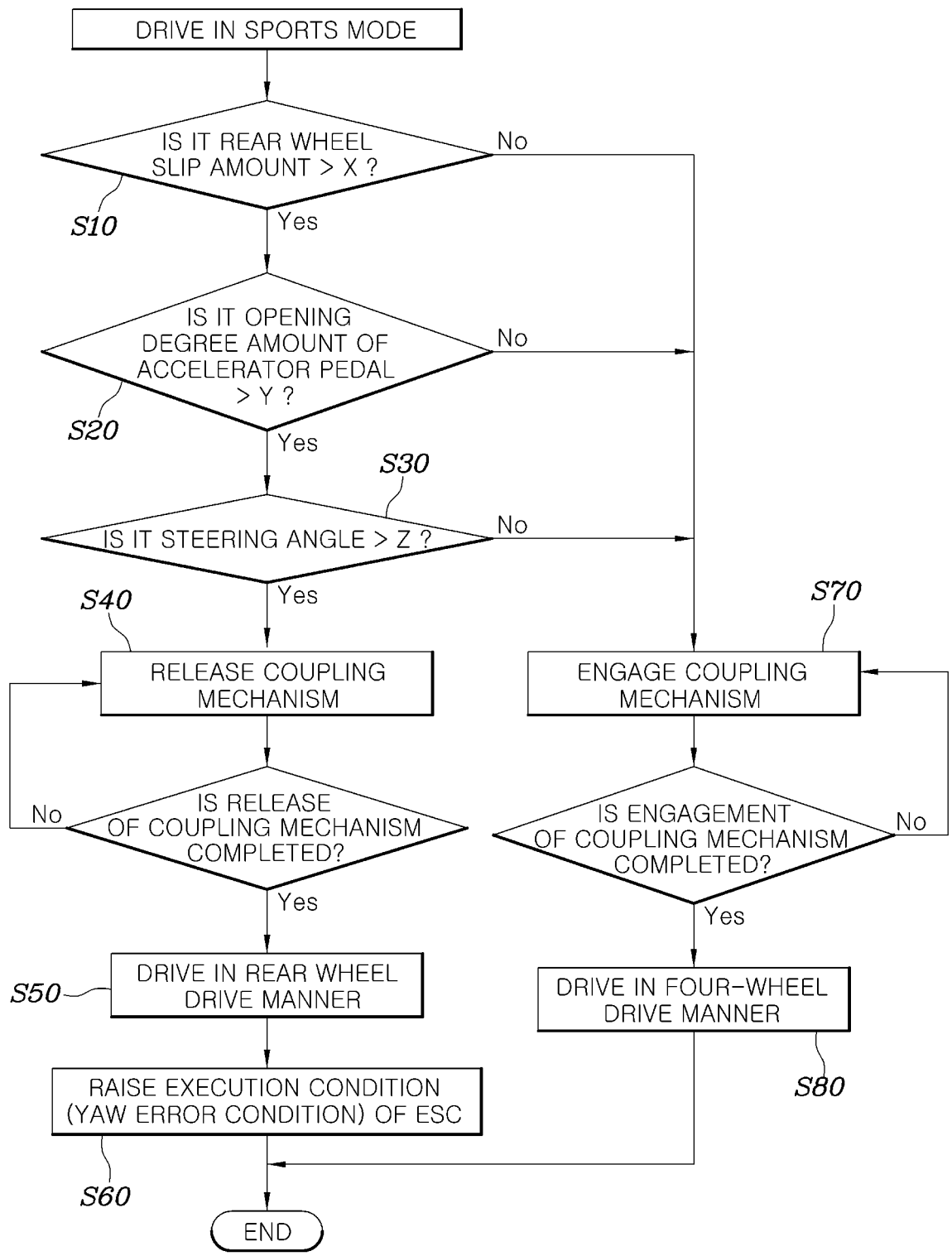
FIG. 4 is a flowchart illustrating a driving control process for a vehicle according to an exemplary embodiment of the present invention.

Referring to FIG. 4, in the sporty driving determination operation, the controller CLR determines whether sporty driving is required for the vehicle due to an output value reflecting a driving state of the vehicle which is driving in a sports mode.

For example, when a rear wheel slip amount exceeds a reference value, an opening degree amount of the accelerator pedal exceeds a reference value, and a steering angle exceeds a reference value, the controller CLR may determine the situation in which whether the sporty driving is required.

In the rear-wheel drive control operation, when the situation is determined as requiring the sporty driving, the controller CLR controls the clutch mechanism 20 to be released to allow the vehicle to drive in a rear wheel drive manner.

Thus, when the vehicle is driving in the rear wheel drive manner, the controller CLR may control to raise an execution condition of electronic stability control (ESC) of the vehicle. The execution condition of the ESC may be raised within a level at which driving stability of the vehicle is secured.

That is, a yaw error may be applied as a factor for determining whether to execute the ESC. When the vehicle is driving in the rear wheel drive manner, a threshold value of the yaw error is raised such that the execution condition of the ESC becomes insensitive and thus the vehicle may perform drift driving.

Furthermore, when the driving state is determined as a situation in which the sporty driving is not required, the controller CLR may further include a 4WD control operation of controlling the clutch mechanism 20 to be engaged to allow the vehicle to drive in a 4WD manner.

To describe an entirety of a driving control flow according to an exemplary embodiment of the present invention with reference to FIG. 4, in a state in which the vehicle is driving in a sports mode, whether a driver has an intent to drive the vehicle to be sporty is determined by monitoring a vehicle speed, a rear wheel speed, an accelerator position sensor (APS), and a steering angle.

During the monitoring, it is determined whether a rear wheel slip amount exceeds X (S10), an opening degree amount of the accelerator pedal exceeds Y (S20), and a steering angle exceeds Z (S30). When all the above-described conditions are satisfied as the results of the determination, the coupling mechanism is released (S40).

Thus, the front wheel drive motor 10 and the front wheel FW are mechanically released such that a driving force is delivered to only the rear wheel RW through the rear wheel drive motor 30. Consequently, the vehicle is driving in a rear wheel drive manner (S50).

Furthermore, a yaw error condition which is an execution condition of the ESC is raised (S60) such that an execution of the ESC becomes insensitive. Consequently, the drift driving is possible according to a driving intent of the driver such that the fun of driving may be provided.

Meanwhile, when any one of the above-described conditions is not satisfied as the results of the determination in operations S10 to S30, the coupling mechanism is controlled to be engaged (S70).

Thus, the front wheel drive motor 10 and the front wheel FW are mechanically connected such that the driving force is independently delivered to the rear wheel RW and the front wheel FW through the rear wheel drive motor 30 as well as the front wheel drive motor 10. Consequently, the vehicle is driving in a 4WD manner (S80).

Therefore, it is possible to improve driving safety against an escape due to low friction which is inherent to a 4WD manner and increase an acceleration force according to high friction driving.

As described above, according to an exemplary embodiment of the present invention, when sporty driving is required for the driver in a sports mode, the front wheel drive motor 10 and the front wheel FW are mechanically released such that the vehicle is controlled to drive in a rear wheel drive manner. Therefore, drift driving of the vehicle is possible such that the fun of driving is provided.

Meanwhile, when the sporty driving is not required for the driver, the front wheel drive motor 10 and the front wheel FW are connected such that the vehicle is controlled to drive in a 4WD manner. Therefore, it is possible to improve driving safety against an escape due to low friction which is inherent to a 4WD manner and improve acceleration performance according to a high friction driving characteristic.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling driving of a vehicle in which a front wheel drive motor and a rear wheel drive motor are operably provided to independently deliver a driving force to a front wheel and a rear wheel of the vehicle, respectively, and a clutch mechanism is mounted between the front wheel and the front wheel drive motor to selectively engage the front wheel and the front wheel drive motor, the method comprising:
   determining, by a controller, a situation in which sports mode driving is required of A for the vehicle according to a driving state of the vehicle which is driving in a sports mode; and
   upon determining that the driving state of the vehicle is the situation in which the sports mode driving is required, controlling, by the controller, the clutch mechanism to release a coupling between the front wheel and the front wheel drive motor for the vehicle to drive in a rear wheel drive manner.

2. The method of claim 1, further including:
   upon determining that a rear wheel slip amount exceeds a first reference value, an opening degree amount of an accelerator pedal exceeds a second reference value, and a steering angle exceeds a third reference value, determining, by the controller, the driving state of the vehicle, as the situation in which the sports mode driving is required.

3. The method of claim 1, further including:
   upon determining that the vehicle is driving in the rear wheel drive manner, raising, by the controller, an execution condition of electronic stability control (ESC) of the vehicle.

4. The method of claim 1, wherein the clutch mechanism utilizes a dog clutch.

5. The method of claim 1, further including:
   upon determining that the driving state is a situation in which the sports mode driving is not required, controlling, by the controller, the clutch mechanism to be engaged for the vehicle to drive in a four wheel drive manner.

6. The method of claim 5,
   wherein, upon determining that a rear wheel slip amount is smaller than a first reference value, an opening degree amount of an accelerator pedal is smaller than a second reference value, or a steering angle is smaller than a third reference value, determining, by the controller, the driving state of the vehicle as the situation in which the sports mode driving is not required.

7. A system for controlling driving of a vehicle in which a front wheel drive motor and a rear wheel drive motor are operably provided to independently deliver a driving force to a front wheel and a rear wheel of the vehicle, respectively, and a clutch mechanism is mounted between the front wheel and the front wheel drive motor to selectively engage the front wheel and the front wheel drive motor, the system including:
   a controller configured to determine a situation in which sports mode driving is required for the vehicle according to a driving state of the vehicle which is driving in a sports mode; and
   upon determining, by the controller, that the driving state is the situation in which the sports mode driving is required, the controller is configured to control the clutch mechanism to release a coupling between the front wheel and the front wheel drive motor for the vehicle to drive in a rear wheel drive manner.

8. The system of claim 7, wherein, upon determining that a rear wheel slip amount exceeds a first reference value, an opening degree amount of an accelerator pedal exceeds a second reference value, and a steering angle exceeds a third reference value, the controller is configured to determine the driving state of the vehicle, as the situation in which the sports mode driving is required.

9. The system of claim 7, wherein, upon determining that the vehicle is driving in the rear wheel drive manner, the controller is configured to raise an execution condition of electronic stability control (ESC) of the vehicle.

10. The system of claim 7, wherein the clutch mechanism utilizes a dog clutch.

11. The system of claim 7, wherein, upon determine that the driving state is determined as a situation in which the sports mode driving is not required, the controller is configured to control the clutch mechanism to be engaged for the vehicle to drive in a four wheel drive manner.

12. The system of claim 11, wherein, upon determining that a rear wheel slip amount is smaller than a first reference value, an opening degree amount of an accelerator pedal is smaller than a second reference value, or a steering angle is smaller than a third reference value, the controller is configured to determine the driving state of the vehicle, as the situation in which the sports mode driving is not required.

* * * * *